United States Patent
Long (10) Patent No.: US 12,295,303 B2
(45) Date of Patent: May 13, 2025

(54) PLANT SUPPORT

(71) Applicant: Rodney G. Long, North Lakewood, WA (US)

(72) Inventor: Rodney G. Long, North Lakewood, WA (US)

(73) Assignee: Evans Manufacturing Company, LLC, North Lakewood, WA (US)

( * ) Notice: Subject to any disclaimer, the term of this patent is extended or adjusted under 35 U.S.C. 154(b) by 0 days.

(21) Appl. No.: 18/213,888

(22) Filed: Jun. 26, 2023

(65) Prior Publication Data

US 2024/0130299 A1 Apr. 25, 2024
US 2024/0224888 A9 Jul. 11, 2024

Related U.S. Application Data

(63) Continuation of application No. 15/817,084, filed on Nov. 17, 2017, now Pat. No. 11,737,397.

(51) Int. Cl.
*A01G 9/12* (2006.01)

(52) U.S. Cl.
CPC .................... *A01G 9/128* (2013.01)

(58) Field of Classification Search
CPC .......... A01G 9/12; A01G 9/128; A01G 17/06; A01G 17/08
See application file for complete search history.

(56) References Cited

U.S. PATENT DOCUMENTS

| | | | | |
|---|---|---|---|---|
| 362,656 | A | * | 5/1887 | Pheatt .................... A01G 17/06 248/302 |
| 834,867 | A | | 10/1906 | Biesemeier |
| 881,593 | A | | 3/1908 | Knox |
| 896,701 | A | | 8/1908 | Austin |
| 899,046 | A | | 9/1908 | Henshaw |
| 947,912 | A | | 2/1910 | Jaquet |
| 965,599 | A | | 7/1910 | Ramsburg |
| 1,338,612 | A | | 4/1920 | Buschardt |
| 1,488,380 | A | * | 3/1924 | Blake .................... A01G 17/08 211/183 |

(Continued)

FOREIGN PATENT DOCUMENTS

| AU | 2018264021 | 11/2018 |
|---|---|---|
| CA | 3020937 | 10/2018 |

(Continued)

*Primary Examiner* — Peter M Poon
*Assistant Examiner* — Marisa V Conlon
(74) *Attorney, Agent, or Firm* — Puget Sound Patents; Dwayne E Rogge (57) ABSTRACT

Disclosed herein is a supporting bracket component of a support system for temporarily supporting a plant via a fixed a fixed structure of vertical poles which support at least one substantially horizontal support cord, the support system comprising: a substantially vertical alignment wire having a top end and a bottom end; a curve greater than 180° in the top end of the vertical alignment wire forming a hanging hook portion configured to be selectively supported by one of the support cords; at least one supporting bracket coupled to one of the substantially horizontal support cords and capturing the alignment wire and the plant; wherein the alignment wire maintains vertical orientation of the plant substantially above the point at which the plane protrudes from the ground.

4 Claims, 5 Drawing Sheets

(56) References Cited

U.S. PATENT DOCUMENTS

| | | | |
|---|---|---|---|
| 1,529,705 A | 3/1925 | Mcknight | |
| 1,543,957 A | 6/1925 | Steiner | |
| 1,791,692 A * | 2/1931 | Swenson | E04H 17/124 256/57 |
| 1,890,217 A | 12/1932 | Dobbins | |
| 1,971,047 A * | 8/1934 | Moritz | E04H 17/124 256/57 |
| 2,227,553 A * | 1/1941 | Paque | E04H 17/06 52/153 |
| 3,302,328 A | 2/1967 | King | |
| 3,394,922 A * | 7/1968 | Bradbury | E04H 17/124 256/57 |
| 3,494,072 A | 2/1970 | Olson | |
| 3,518,791 A | 7/1970 | Carson et al. | |
| 3,526,993 A | 9/1970 | Siebol | |
| 3,972,511 A | 8/1976 | Balestrini | |
| 4,099,299 A * | 7/1978 | Bruggert | A01G 17/08 24/336 |
| 4,270,581 A * | 6/1981 | Claxton | E04H 17/268 140/57 |
| 4,329,762 A | 5/1982 | Maidhof | |
| 4,899,990 A * | 2/1990 | Winders | E04H 17/124 174/173 |
| 5,004,211 A * | 4/1991 | Rayner | E04H 17/10 256/48 |
| 5,052,086 A | 10/1991 | Nasuno | |
| 5,210,973 A | 5/1993 | Kratky et al. | |
| 6,254,049 B1 * | 7/2001 | Goehly | A01G 17/08 248/302 |
| 6,293,521 B1 * | 9/2001 | Parrish | A01G 17/08 256/48 |
| 6,378,175 B1 | 4/2002 | Vanderpan | |
| 6,389,656 B1 | 5/2002 | Pellikaan | |
| 6,973,751 B2 * | 12/2005 | Pierce, Jr. | A01G 17/06 47/46 |
| 8,894,041 B2 * | 11/2014 | Sachs | E04H 17/12 256/57 |
| 8,935,878 B2 * | 1/2015 | Brusco | A01G 17/06 47/45 |
| 10,477,782 B1 * | 11/2019 | Long | A01G 17/08 |
| 2005/0188610 A1 | 9/2005 | Shaver et al. | |
| 2013/0125457 A1 | 5/2013 | Pennors | |
| 2013/0333283 A1 * | 12/2013 | Patterson, Sr. | A01G 17/14 47/45 |
| 2015/0113869 A1 * | 4/2015 | Brown | A01G 9/12 47/20.1 |
| 2015/0342131 A1 | 12/2015 | Carpio et al. | |

FOREIGN PATENT DOCUMENTS

| | | | |
|---|---|---|---|
| GB | 2048637 A * | 12/1980 | A01G 9/12 |
| NZ | 748356 A | 3/2022 | |

* cited by examiner

PLANT SUPPORT

This application is a continuation of U.S. Ser. No. 15/817,084 filed Nov. 17, 2017, incorporated herein by reference.

BACKGROUND OF THE DISCLOSURE

Field of the Disclosure

This invention relates to the field of devices used in orchards or the like for releasably supporting a plant against a support structure having substantially horizontal support members and in particular against the substantially horizontal support members.

BRIEF SUMMARY OF THE DISCLOSURE

Disclosed herein is a support system for temporarily supporting a plant via a fixed structure of vertical poles which support at least one substantially horizontal support cord. The support system comprising: a substantially vertical alignment wire having a top end and a bottom end; a curve greater than 180° in the top end of the vertical alignment wire forming a hanging hook portion configured to be selectively supported by one of the support cords; at least one supporting bracket coupled to one of the substantially horizontal support cords and capturing the alignment wire and the plant; wherein the alignment wire maintains vertical orientation of the plant substantially above the point at which the plane protrudes from the ground.

The support system may further comprise at least one connection band capturing the plant and the alignment wire.

The support system may be arranged wherein the connection band captures the plant, the alignment wire, and at least one support cord.

The support system may be arranged wherein the curve in the top end of the alignment wire is configured to contact a bottom portion of the support cord when the alignment wire is lifted.

The support system may be arranged wherein the curve in the top end of the alignment wire comprises a reverse curve portion forming a gap between the reverse curve and a vertical extension that is smaller than the support cord.

The support system may be arranged wherein the curve in the top end of the alignment wire comprises a reverse curve portion which contacts a vertical extension portion of the alignment wire.

The support system may be arranged wherein the curve in the top end of the alignment wire is greater than 360°.

DETAILED DESCRIPTION OF THE DISCLOSURE

Disclosed herein is a support system 20 and method for supporting trees and bushes (plants) 22 such as in an orchard or other location wherein the plant 22 is not expected to grow in the correct or desired manner. For example, it may be desired to provide a plant 22 with a trunk 24 that grows in vertical alignment directly above the bottom 26 of the plant where the plant protrudes from the ground 18 such that the trunk 24 will not buckle or bend in later stages of development, such as when weight is added from rain, or fruit, or when other outside forces are encountered such as wind.

In previously known support systems using similar supporting brackets, the supporting brackets were sometimes installed incorrectly resulting in failure. Even when installed correctly, the orientation of the hooks often resulted in difficulty installing the brackets, and slippage.

In the field of growing of plants, especially fruit and vegetable bearing plants, it is often desired to have a single plant 22 produce as much food as possible in as small of a transverse plant footprint as is possible. Thus, plants 22 are commonly grown in longitudinal rows which allow maximum transverse access to the produce (grains, fruit, or vegetables) of the plant with as narrow a transverse footprint as possible. Such rows of plants are well-known in the fields of tomatoes, raspberries, blackberries, grapes and more recently in the fields of trees such as apples, oranges, pears, plums etc. These plants are often maximized in a longitudinal direction 12 (see the axes 10 of FIG. 1) as well as often maximized in a vertical direction 14, while being substantially minimized in a transverse direction 16. This growth arrangement results in a plant 22 which is often not stable without support in the transverse direction 16 and may also not be stable without support in the longitudinal direction 12. Thus, it is common to provide a fixed support structure 28 (trellis) generally comprising a plurality of vertically oriented posts 30 (*a-d*) with a plurality of substantially horizontal support cords 32 (*a-g*). The support cords 32 may be metallic strands (wires), synthetic or natural fiber ropes, strings, small diameter rods etc.

There could be many wire formations (support cord) used to accommodate different orchards, vineyards, and trellis systems, all serving the same purpose.

In this disclosure, general components will have a numeric label (such as support cord 32) and specific components may have an alphabetic suffix (such as the lowermost or first horizontal support cord labeled as 32*a*-32*g*). In this disclosure, the trunk 24 or branches of the plant 22 are attached to the horizontal support cords 32 by way of a novel supporting bracket 34 which has one end 36 which engages the support cord 32, and wraps around or captures the trunk 24 or branch of the plant 22. Each supporting bracket has a second end 38 which also engages the support cord 32. A similar supporting bracket is disclosed in U.S. Pat. No. 6,254,049, incorporated herein by reference.

In such growing arrangements, it is commonly desired that the trunk 24 of the plant 22 grow this substantially straight, and in vertical 14 alignment with the bottom 26 of the plant 22. Thus disclosed herein is a support system 20 as shown in FIG. 2 comprising an alignment wire 40 having at the upper end thereof, a bend 42 forming a hanging hook portion 44 which in this Fig. rests upon the uppermost horizontal support cord 32*g*.

In this example, the trunk 24 or branches of the plant 22 are attached to the horizontal support cords 32 by way of a plurality of supporting brackets 34 (*a-d*) which engage the support cord 32 on one end 36 and the alignment wire 40 on the opposing end. The supporting bracket 34 then wraps around and captures the trunk 24 or branch of the plant 22.

The alignment wire 40 has a median portion vertically below the hanging hook portion 44, the median portion forming a vertical extension 46. The alignment wire 40 having a bottom end 48. The vertical extension 46 providing additional attachment locations for connection bands 50 along the plant 22 which may be adhesive tape, twine, zip ties, twist wires, hook and loop fastener bands, snapped bands, or other attachment devices which can be used to connect the alignment wire 40 to the support cords 32 and/or to the trunk 24 branches of the plant 22.

Figure 1:
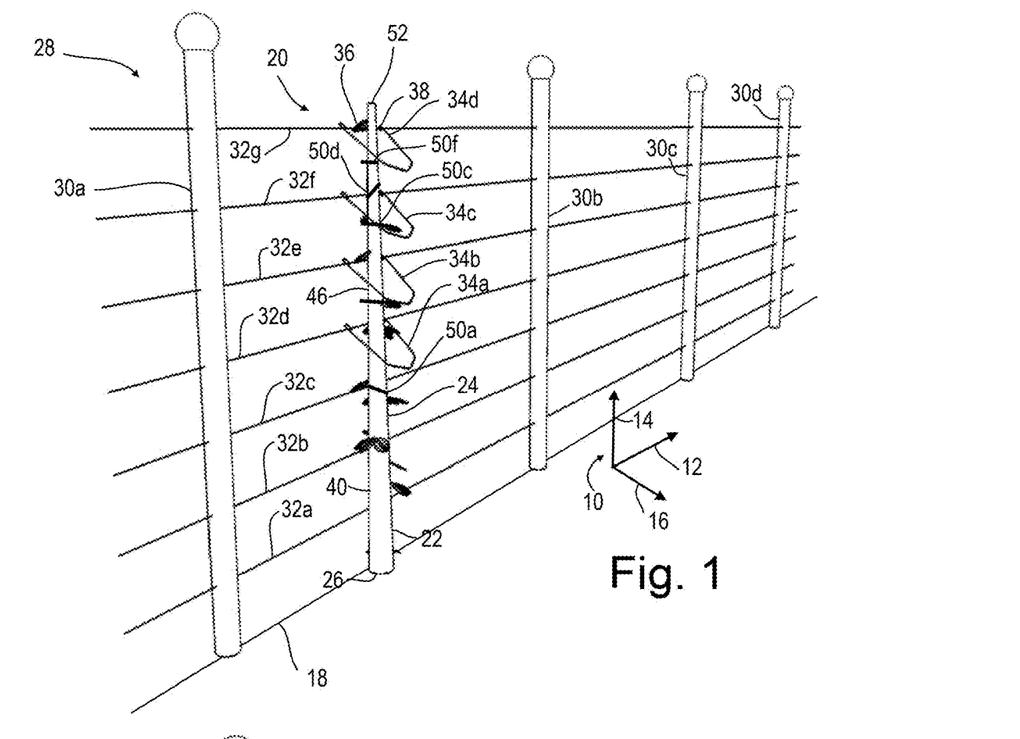
FIG. 1 is an environmental view of one example of the support system and method for trees and bushes (plants).
Figure 2:
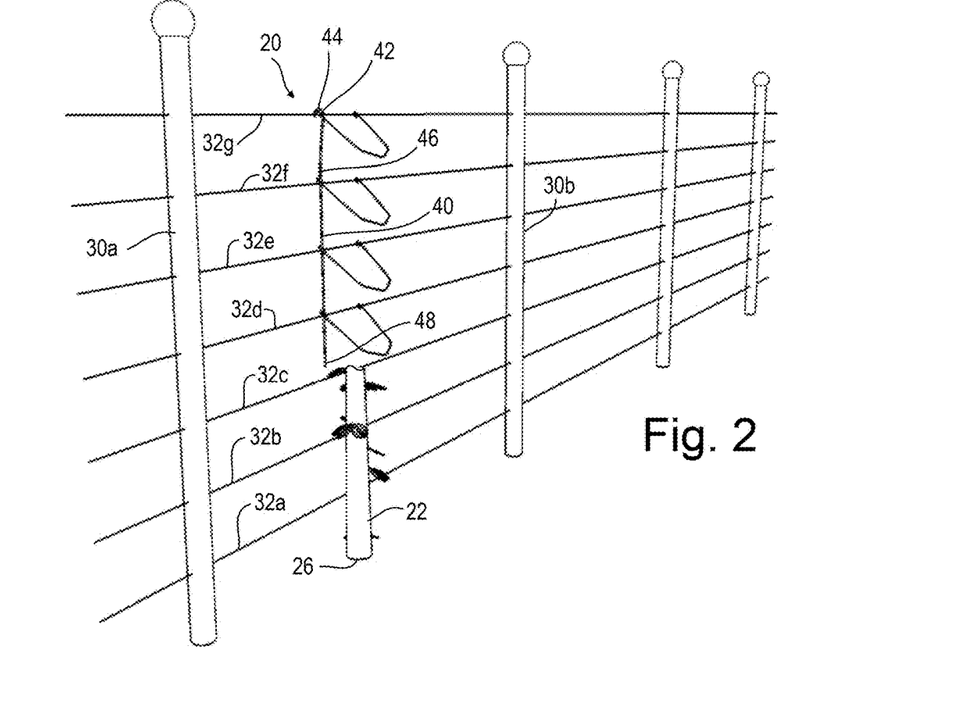
FIG. 2 shows FIG. 1 with the plant removed.

FIG. 1, for example, shows a first connection band 50*a* capturing the trunk 24 of the plant 22 as well as the support cord 32*c* and the alignment wire 40 (more easily seen in FIG. 2). A second connection band 50*b* is positioned vertically between the fourth support cord 32*d* and the fifth support cord 32*e* and thus captures the trunk 24 of the plant 22 and the alignment wire 40. Attachment in this position vertically between the fourth support cord 32*d* and the fifth support cord 32*e* would not be possible without the alignment wire 40.

Figures 3, 4:
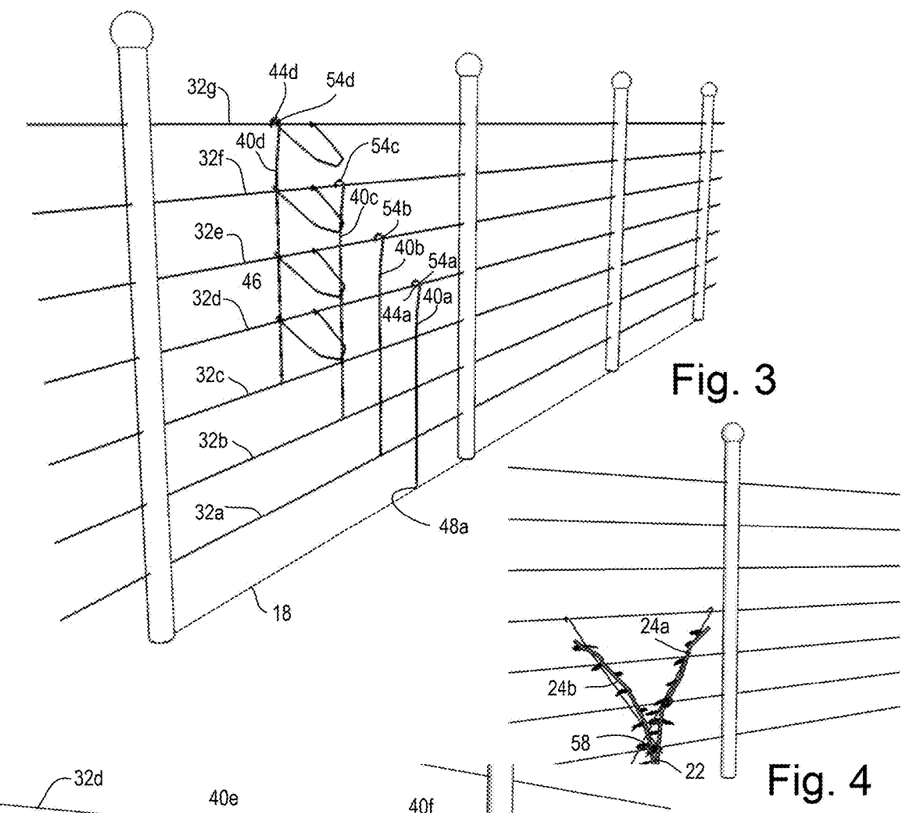
FIG. 3 shows alternate placement of the apparatus shown in FIG. 1 on the fixed support structure.
FIG. 4 shows alternate placement of the apparatus shown in FIG. 1 on the fixed support structure.
Figure 5:
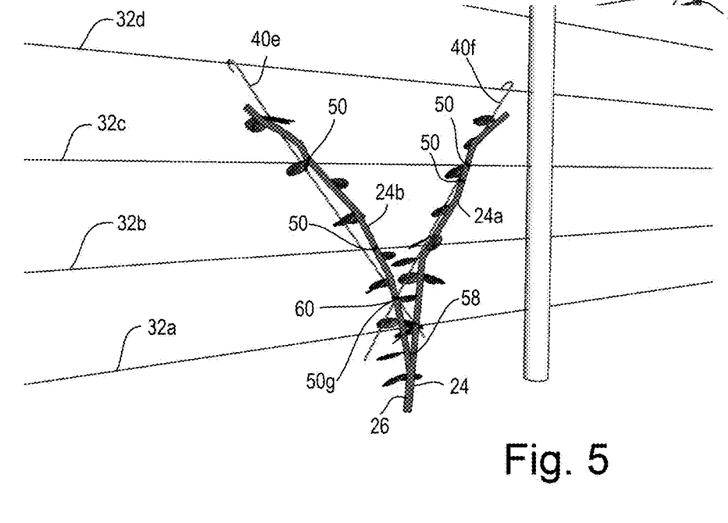
FIG. 5 is an enlarged view of FIG. 4.

In FIG. 3 it can be appreciated that the alignment wire 40 is movable to different vertical and horizontal positions by movement of the hanging hook 44 longitudinally along the support cord 32 from which it is suspended and, vertically by hanging the alignment wire from vertically offset support cords 32 at different vertical heights. Movement in this way allows continued use of a single alignment wire 40 as the plant 22 grows, where the hook portion 44 substantially maintains position relative to the top 52 of the plant 22.

As the alignment wire is rigid, (not easily bending; physically inflexible or stiff) a user is able to grasp the bottom 48 or median portion 46 of the alignment wire 40 and raise the alignment wire 40 without a ladder or stool, in that the rigid alignment wire 40 will not bend under its own weight.

As the plant 22 grows, the alignment wire 40 may be repositioned to higher and higher support cords 32. For example, in FIG. 3 the support wire 48 is shown having a hanging hook 44*a* in a fourth position 54*a* resting upon the fourth support cord 32*d* as numbered from the bottom support cord 32*a*. In this position, the bottom 48*a* of the alignment wire 40*a* is substantially at the same horizontal level as the bottom 26 of the plant (ground level 18) and therefore, lower positions than this would result in the lower end 48*a* being below ground level.

As the plant grows, the alignment wire 40 may be repositioned (raised) from the fourth position 54*a* to a fifth position 54*b*, to a sixth position 54*c*, to a seventh position 54*d* wherein the hook portion 44*d* rests upon the uppermost support cord 32*g* and additional vertical repositioning is not possible without addition of higher support cords 32 or a vertical extension of the support wire 40 extending vertically above the hanging hook portion 44. In one example it is desired that some portion of the hanging hook 40 remain above the top 52 of the plant 22 so as to provide a secure support to the top 52 of the plant 22. As the upper region of the plant 22 in some examples is more susceptible to damage, it is most needed to support this region.

In FIG. 4 is shown another example wherein the trunk 24 of the plant 22*a* has been split at 58 into right trunk 24*a* and left trunk 24*b*. This arrangement has been known in some plant varieties to result in a higher volume of produce per base trunk 24. In such an example, it is clear that each of the right trunk 24*a* and left trunk 24*b* grow at an angle between 0° and 180° to the vertical axis 14. Thus, a plurality of alignment wires 40*f* aligned with and supporting the right trunk 24*a*, and alignment wire 40*e* aligned with and supporting the left trunk 24*b* may be provided. A plurality of connection bands 50 may be utilized to attach the right 24*a* and left trunk 24*b* to the support cords 32 and/or to the alignment wires 40. In this example, the alignment wires 40 are vertically oriented at an angle greater than 0° and intersect (cross) at an intersection location 60. Another connection band 50*g* may be utilized to attach the crossed alignment wires 40*f* and 40*e* at the intersection 60. In addition, the supporting brackets 34 may be utilized as in the example shown in FIG. 1.

Figure 6:
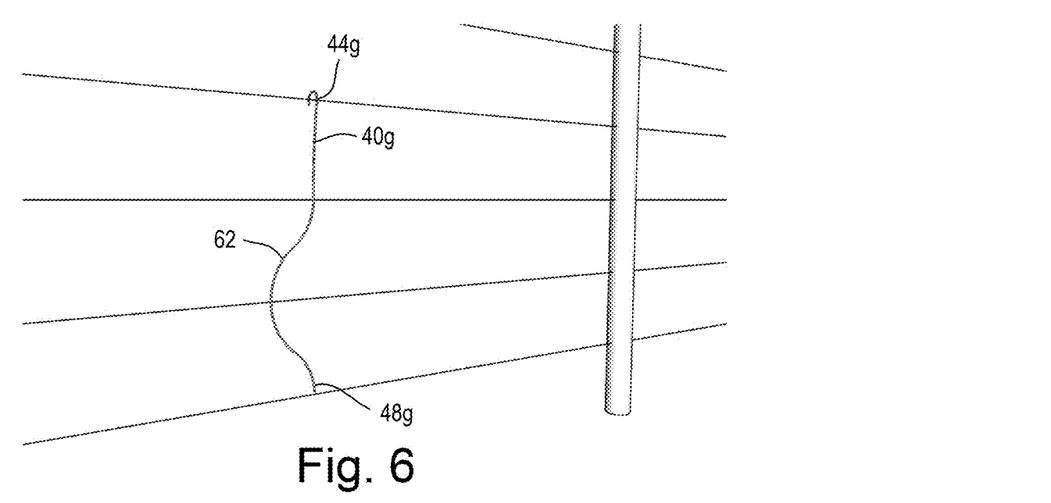
FIG. 6 shows the example of FIG. 1 with a plurality of longitudinal bends.

In FIG. 6 is shown another example which may be combined with the other examples disclosed herein. In this example, the alignment wire 40*g* has a longitudinal bend 62 between the hook portion 44*g* and the bottom 48*g*. This longitudinally bent example may be utilized where angle or bent shape training of the plant 22 is desired. For example, the plant 22 may be attached to the longitudinal bend portion 62 by connecting bands 50.

Figure 7:
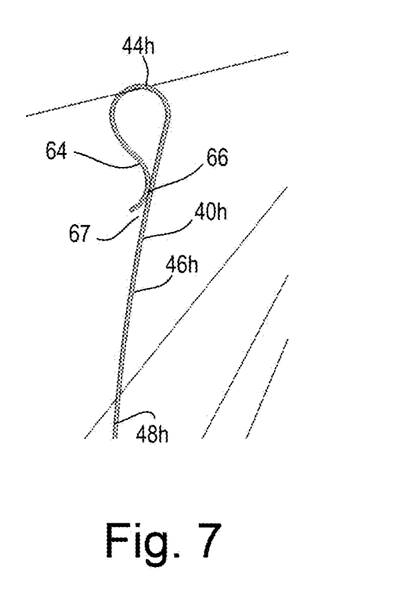
FIG. 7 in an enlarged view of one example of the curved hook portion of FIG. 1.

In FIG. 7 is shown another example which may be combined with the other examples disclosed herein. This example extends the hanging hook 44*h* curve downward to a reverse curve 64 which touches the vertical extension 46*h* or nearly touches the vertical extension 46*h* to form a contact point or narrow gap 66 there between. This reverse curve 64 restricting the ability of the hook 44*h* to be accidentally removed (lifted) from the support cord 32 such as by wind or vibration. In addition, the reverse curve 64 may continue away from the vertical extension 46*h* to form an entry region 67 assisting in placement of the alignment wire on the support cord 32.

Figure 8:
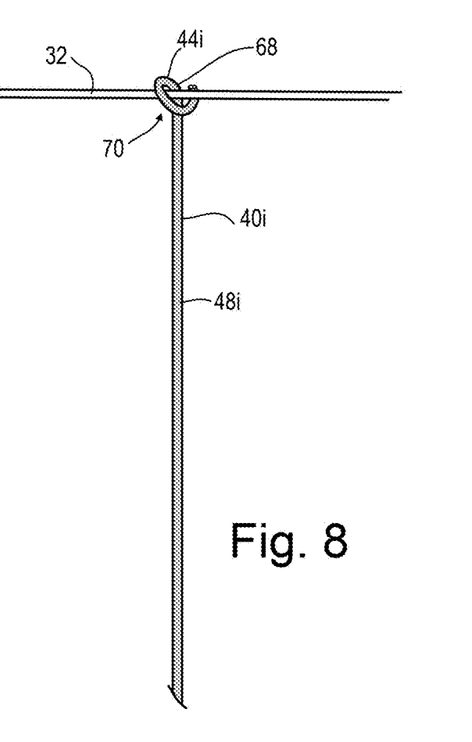
FIG. 8 is an enlarged view of another example of the curved hook portion of FIG. 1.
Figure 9:
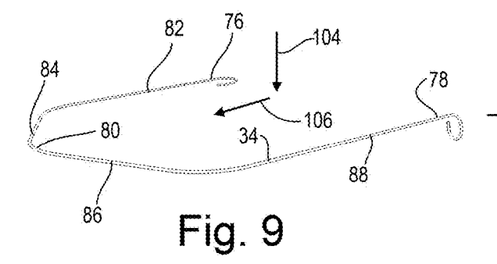
FIG. 9 is an isometric view of a supporting bracket component of the support system shown in FIG. 1.
Figure 10:
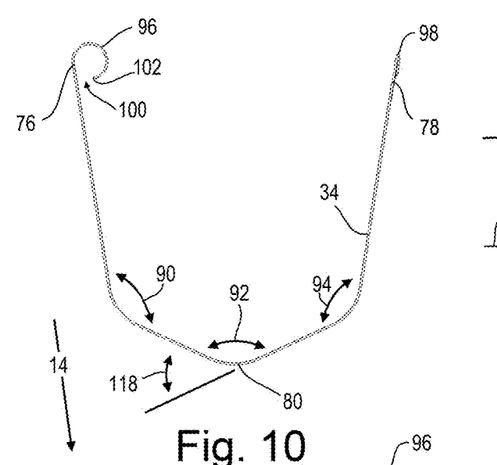
FIG. 10 is a top view of the supporting bracket shown in FIG. 9.
Figure 11:
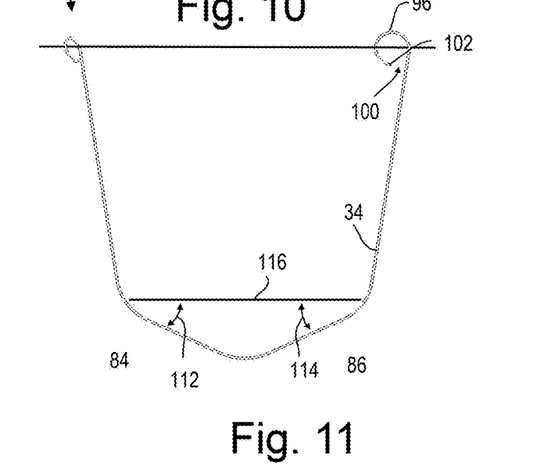
FIG. 11 is a bottom view of the supporting bracket shown in FIG. 9.

FIG. 8 shows another example where the hanging hook portion 44*i* continues to form a spiral curve 68. In one form, the spiral curve 68 combined with the hanging hook portion forms a spiral curve which may be greater than 360° in a vertical plane. The spiral curve 68 in this example has an open region 70 on the bottom thereof at an angle of about 45° or between 90° and 0° from the curve of the hanging hook 44*i*. This arrangement allows the alignment wire 40*i* to be set upon the support cord 32 past the open region 70, whereupon the alignment wire 40 may be rotated to fully engage the support cord 32, again to restrict the ability of the hook 44*i* to be accidentally removed from the support cord 32 by wind or vibration.

The term "normal" used herein to define a perpendicular line or plane, especially one perpendicular to a tangent line of a curve, or a tangent plane of a surface, at the point of contact, and not the more common definition of conforming to the standard or the common type; usual; not abnormal; regular; natural. In particular, a line 74 is shown normal to the base plane 72 and intersecting the base plane 72.

Through use of prior art support brackets, it was discovered that the support brackets often were not securely attached to the support cords. This insecure attachment often causing failure of the overall support system, often in subtle ways that were overlooked by those working in the fields where these support brackets are used. Following installation until adjustments were scheduled, failures would often go unnoticed, resulting in less than optimal growth of the plant 22 being supported.

Once discovering the problem, Applicant invented the disclosed bracket to overcome the perceived drawbacks of the prior art brackets in some applications. By implementing the novel features disclosed herein, installation errors and slippage along the support cord 32 are reduced.

The supporting bracket component 34 of the support system 20 for trees and bushes 22 shown in one example at FIG. 9-16 comprises: a first end 76, a second end 78, and a median point 80 there between. In one example, during manufacture, a crease 81 is formed in the median portion 80. The crease 81 or detent sets the shape of the supporting bracket 34. Experimentation with such a creased median portion 80 showed that the tensile resiliency of the supporting bracket 34 improved over non-creased supporting brackets.

For ease in description a base plane 72 is disclosed. The base plane defined by the first end 76, second end 78, and median point 80 of the supporting bracket 34, in that three points define a plane geometrically.

In this example the supporting bracket 34 comprises a first leg 82 extending from the first end 76 toward the median point 80, the first leg 82 lying substantially in the base plane 72. The first leg 82 connected to a second leg 84 extending from the first leg 82 to the median point 80, the second leg 84 lying substantially in the base plane 72. The second leg 84 at an angle 90 of between 95° and 115° to the first leg 82. This angle allows the connecting segment (legs 84 and 86) to be non-linear, increasing the expansion force of the supporting bracket 34 between the first end 76 and the second end 78.

Also shown in this example is a third leg 86 extending from the second leg 84 toward the second end 78. The third leg 86 also lying substantially in the base plane 72. The third leg 86 at an angle 92 of between 10° and 45° to the second leg 84. This angle 92 shown in this example as a curve, where the angle 92 is measured from the linear portion of the associated legs.

The supporting bracket 34 of this example also comprising a fourth leg 88 extending from the third leg 86 to the second end 78. The fourth leg 88 also lying substantially in the base plane 72. The fourth leg 88 at an angle 94 of between 95° and 115° to the third leg 86. This angle 94 also facilitates the connecting segment (legs 84 and 86) to be non-linear, increasing the expansion force of the supporting bracket 34 between the first end 76 and the second end 78.

Also shown is a non-planar hook 96 configured to attach the supporting bracket 34 to a horizontal support cord component 32 of the support system 20 for trees and bushes 22 as shown in FIG. 1. The non-planar hook 96 extending from the first leg 76 generally away from the median point 80. The non-planar hook 96 scribing less than 360°, thus forming an opening 100 between the distal end 102 of the non-planar hook 96 and the first leg 82.

Figure 16:
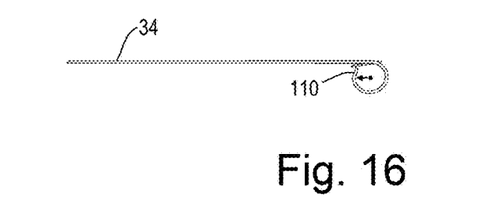
FIG. 16 is a left side view of the supporting bracket shown in FIG. 9.
Figure 17:
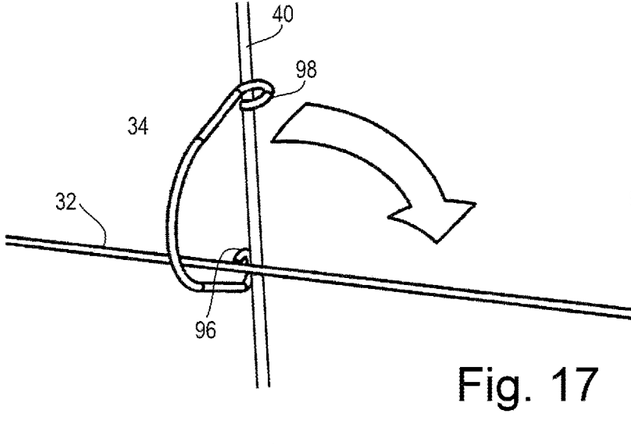
FIG. 17 is an environmental view of one example of the support system and method for trees and bushes (plants) with the supporting bracket being installed on an alignment wire and horizontal wire.

In FIG. 16, it can be seen that in one example the distal end 108 of the normal circular hook 98 comprises a linear region 110. This linear region aiding in construction and also helping to hinder the support cord 32 from accidently passing through the opening 106 and releasing the supporting bracket 34.

Figure 13A:
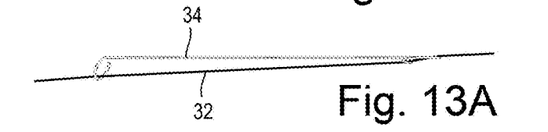
FIG. 13A and FIG. 13B are rear views of the supporting bracket shown in FIG. 9.
Figure 18:
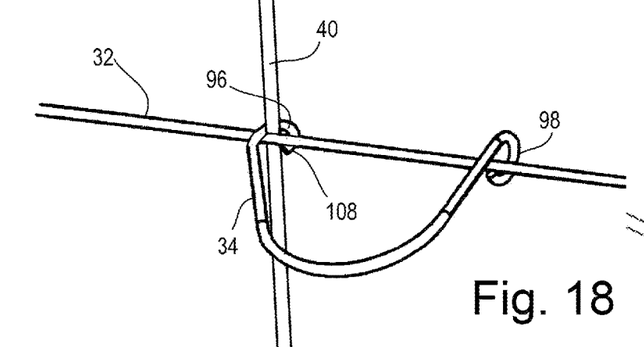
FIG. 18 is an environmental view of one example of the support system and method for trees and bushes (plants) with the supporting bracket incorrectly installed on an alignment wire and horizontal wire.
Figure 19:
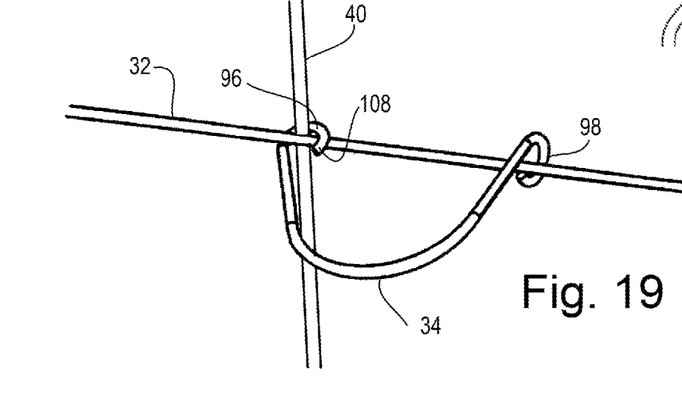
FIG. 19 is an environmental view of one example of the support system and method for trees and bushes (plants) with the supporting bracket correctly installed on an alignment wire and horizontal wire.
Figure 20:
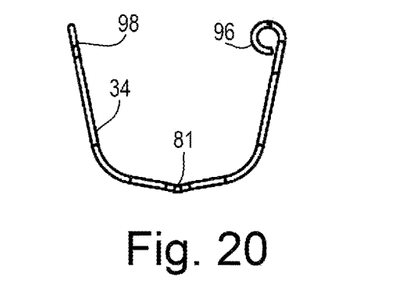
FIG. 20 is a top view of another example of a supporting bracket as shown in FIG. 1.
Figure 21:
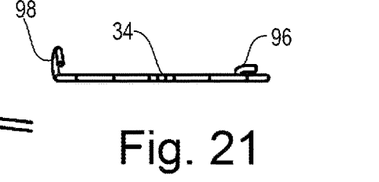
FIG. 21 is an end view of the supporting bracket shown in FIG. 20.
Figure 22:
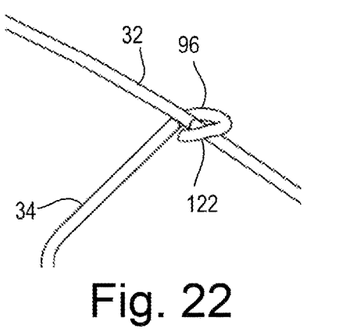
FIG. 22 is a detail view of the connection of one example of the supporting bracket to the support cord.

In FIG. 18 it can be seen that the non-planar hook 96 has been placed around the support cord 32 and alignment wire 40 in such a way that the distal end 108 does not "hook" or capture the support cord 32. As previously described, the non-planar hook 96 arcs away from the base plane 72 with a return hook 122 and thus when correctly installed as shown in FIG. 19, or FIG. 13A correctly engages the support cord 32. the return hook 122 of the non-planar hook 96 curves back toward the base plane 72 and locks the supporting bracket 34 to the support cord 32.

Figure 13B:
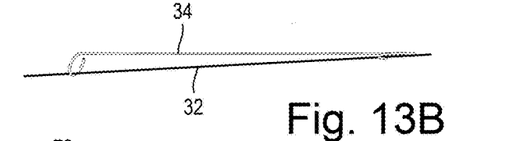
Figure 14:
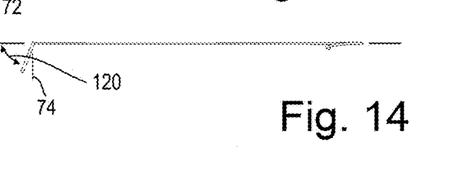
FIG. 14 is a rear view of the supporting bracket shown in FIG. 9 taken along line 14 of FIG. 11.
Figure 15:
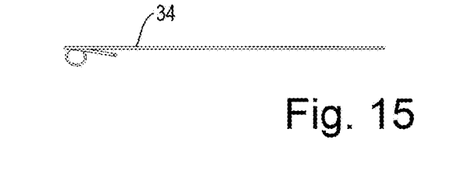
FIG. 15 is a right side view of the supporting bracket shown in FIG. 9.

In FIG. 13B and FIG. 18, the supporting bracket 34 has been incorrectly installed, and will not capture the support cord 32. This was found to occasionally result in slippage of the support brackets of prior, planar examples. Prior art examples using a circular hook lying in the base plane 72 were easily incorrectly installed. Incorrect installation of the supporting bracket 34 will be immediately evident, as it will generally not attach to the support cord 32.

Figure 12:
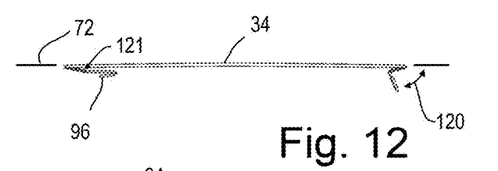
FIG. 12 is a front view of the supporting bracket shown in FIG. 9.

The non-planar hook 96 shown in FIG. 12 lies at an angle 121 of greater than 1° and less than 45° of the base plane 72 prior to application of a rotational force, such as attachment to a support cord 32. This allows the supporting bracket 34 to be installed by moving the support bracket 34 downward 104 until contact is made between the first leg 82 and the support cord 32. The supporting bracket 34 then moves forward 104 until the support cord enters the opening 100, capturing the support cord 32.

In one form, the angle 112 of the second leg 84 and angle 114 of the third leg 86 relative to a line 116 extending between the transition points to the adjacent legs is well defined and increases the tensile resiliency of the device. These angles 112/114 also define the angle 118 or 92.

The normal circular hook 98 in one example extends from the fourth leg 88 away from the median point. The normal hook in one example scribing greater than 180° (more than a full circle). In one example, the normal hook lies at an angle 120 of greater than 75° and less than 90° of the base plane.

Also disclosed in the example of FIG. 9-16 is a normal circular hook 98 extending from the fourth leg 88 away from the median point 80. The normal circular hook of one example also scribing less than 360°, forming an opening 106 through which the support cord may pass. The normal hook lying at an angle of greater than 75° and less than 90° of the base plane.

The supporting bracket may be arranged wherein each of the first leg, second leg, third leg, and fourth leg are substantially linear.

The supporting bracket may be arranged wherein the first leg is not parallel to the fourth leg.

The supporting bracket may be arranged wherein the second leg and third leg are not parallel to a line drawn between the intersection of the first leg with the second leg and the intersection of the third leg with the fourth leg.

The supporting bracket may be arranged wherein the supporting bracket is formed of a unitary length of resilient material.

The supporting bracket may be arranged wherein the supporting bracket is formed of a length of spring steel.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A supporting bracket component of a support system for plants, the supporting bracket comprising:
    a unitary length of resilient material comprising a first end, a second end, and a median point there between;
    the first end, second end, median point defining a base plane;
    a first leg extending from the first end toward the median point, the first leg lying substantially in the base plane;
    a second leg extending from the second end toward the median point, the second leg lying substantially in the base plane;
    a non-planar hook at the first end of the unitary length of resilient material, the non-planar hook configured to attach to a horizontal support cord component of the support system for trees and bushes;
    the non-planar hook extending from the first leg, the non-planar hook lying at an angle of greater than 1° and less than 45° of the base plane;
    a return hook portion of the non-planar hook arcing towards the base plane and configured to lock the supporting bracket to the horizontal support cord; and
    a normal hook at the second end of the unitary length of resilient material, the normal hook lying in a plane at an angle to the base plane.

2. The supporting bracket as recited in claim 1 wherein each of the first leg, second leg, are substantially linear.

3. The supporting bracket as recited in claim 1 wherein the first leg is not parallel to the second leg.

4. The supporting bracket as recited in claim 1 wherein the supporting bracket is formed of a length of spring steel.

* * * * *